(12) United States Patent
Lee et al.

(10) Patent No.: US 12,126,001 B2
(45) Date of Patent: Oct. 22, 2024

(54) BATTERY MODULE AND BATTERY PACK INCLUDING THE SAME

(71) Applicant: LG ENERGY SOLUTION, LTD., Seoul (KR)

(72) Inventors: Hyunjae Lee, Daejeon (KR); Junyeob Seong, Daejeon (KR); Myungki Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 479 days.

(21) Appl. No.: 17/617,232

(22) PCT Filed: Jul. 15, 2020

(86) PCT No.: PCT/KR2020/009291
§ 371 (c)(1),
(2) Date: Dec. 7, 2021

(87) PCT Pub. No.: WO2021/080126
PCT Pub. Date: Apr. 29, 2021

(65) Prior Publication Data
US 2022/0238937 A1    Jul. 28, 2022

(30) Foreign Application Priority Data

Oct. 25, 2019    (KR) .................. 10-2019-0133808

(51) Int. Cl.
*H01M 10/658* (2014.01)
*H01M 50/209* (2021.01)
*H01M 50/278* (2021.01)

(52) U.S. Cl.
CPC ....... *H01M 10/658* (2015.04); *H01M 50/209* (2021.01); *H01M 50/278* (2021.01)

(58) Field of Classification Search
CPC ............. H01M 10/658; H01M 50/209; H01M 50/244; H01M 50/271; H01M 50/278; Y02E 60/10
See application file for complete search history.

(56) References Cited

U.S. PATENT DOCUMENTS

| 10,658,716 B2 | 5/2020 | Lee et al. |
| 2014/0014420 A1 | 1/2014 | Nakamura et al. |

(Continued)

FOREIGN PATENT DOCUMENTS

| CN | 205921012 U | 2/2017 |
| DE | 10 2016 217 859 A1 | 3/2017 |

(Continued)

OTHER PUBLICATIONS

Extended European Search Report for European Application No. 20879485.9, dated Jul. 6, 2022.

(Continued)

*Primary Examiner* — Victoria H Lynch
(74) *Attorney, Agent, or Firm* — Birch, Stewart, Kolasch & Birch, LLP

(57) ABSTRACT

The battery module includes a battery cell stack in which a plurality of battery cells are stacked; a module frame that houses the battery cell stack and has an opened front surface and an opened rear surface facing each other; an end plate that covers each of the front surface and the rear surface of the module frame; and an insulator interposed between the battery cell stack and the end plate, wherein the module frame includes a first joining surface formed on sides constituting each of the front surface and the rear surface, wherein the end plate includes a second joining surface joined to the first joining surface, and wherein the insulator includes a rib extending in a direction in which the battery cell stack is located.

16 Claims, 10 Drawing Sheets

(56) References Cited

U.S. PATENT DOCUMENTS

| | | |
|---|---|---|
| 2014/0242429 A1 | 8/2014 | Lee et al. |
| 2014/0255758 A1 | 9/2014 | Tsutsumi et al. |
| 2017/0092905 A1 | 3/2017 | Tsutsumi et al. |
| 2017/0187080 A1 | 6/2017 | Choi et al. |
| 2019/0006647 A1 | 1/2019 | Ryu et al. |
| 2019/0052065 A1 | 2/2019 | Klenner |
| 2019/0131596 A1 | 5/2019 | Yang et al. |
| 2019/0272957 A1 | 9/2019 | Tononishi |
| 2021/0013461 A1 | 1/2021 | Nishikawa |
| 2021/0126313 A1 | 4/2021 | Lee et al. |

FOREIGN PATENT DOCUMENTS

| | | |
|---|---|---|
| EP | 3 621 129 A1 | 3/2020 |
| JP | 9-7561 A | 1/1997 |
| JP | 2013-91085 A | 5/2013 |
| JP | 2013-101809 A | 5/2013 |
| JP | 2014-160617 A | 9/2014 |
| JP | 2015-504574 A | 2/2015 |
| JP | 2016-219344 A | 12/2016 |
| JP | 2018-1245 A | 1/2018 |
| JP | 2019-502250 A | 1/2019 |
| KR | 10-2013-0086677 A | 8/2013 |
| KR | 10-2017-0036639 A | 4/2017 |
| KR | 10-2019-0063109 A | 6/2019 |
| WO | WO 2019/088625 A1 | 5/2019 |
| WO | WO 2019/107764 A1 | 6/2019 |
| WO | WO 2019/176560 A1 | 9/2019 |

OTHER PUBLICATIONS

International Search Report for PCT/KR2020/009291 mailed on Oct. 29, 2020.

Prior Art

Prior Art

BATTERY MODULE AND BATTERY PACK INCLUDING THE SAME

CROSS CITATION WITH RELATED APPLICATION(S)

This application claims the benefit of Korean Patent Application No. 10-2019-0133808 filed on Oct. 25, 2019 with the Korean Intellectual Property Office, the disclosure of which is incorporated herein by reference in its entirety.

TECHNICAL FIELD

The present disclosure relates to a battery module and a battery pack including the same, and more particularly to a battery module having improved welding safety, and a battery pack including the same.

BACKGROUND ART

Secondary batteries, which are easily applicable to various product groups and have electrical characteristics such as high energy density, are universally applied not only for a portable device but also for an electric vehicle or a hybrid electric vehicle, an energy storage system or the like, which is driven by an electric driving source. Such secondary battery is attracting attention as a new environment-friendly energy source for improving energy efficiency since it gives a primary advantage of remarkably reducing the use of fossil fuels and also does not generate by-products from the use of energy at all.

Currently commercialized secondary batteries include a nickel cadmium battery, a nickel hydrogen battery, a nickel zinc battery, and a lithium secondary battery. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Such lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed between them, and an exterior material, i.e., battery case, which seals and houses the electrode assembly together with an electrolyte solution.

Generally, the lithium secondary battery may be classified based on the shape of the exterior material into a prismatic type secondary battery in which the electrode assembly is embedded in a metal can, and a pouch-type secondary battery in which the electrode assembly is embedded in a pouch of an aluminum laminate sheet.

Small-sized mobile devices use one to three battery cells for each device, whereas middle- or large-sized devices such as vehicles require high power and large capacity. Therefore, a middle- or large-sized battery module having a plurality of battery cells electrically connected to one another is used.

The middle- or large-sized battery module is preferably manufactured so as to have as small a size and weight as possible. Consequently, a prismatic type battery or a pouch-type battery, which can be stacked with high integration and has a small weight relative to capacity, is mainly used as a battery cell of the middle- or large-sized battery module.

Meanwhile, in order to protect a plurality of battery cells from external shock, heat, or vibration, the battery module may include a module frame member which houses the battery cell stack composed of a plurality of battery cells in an internal space.

FIG. 1 is a perspective view illustrating a conventional battery module 10.

Referring to FIG. 1, the conventional battery module 10 includes a module frame 20 that houses the battery cell stack therein, and an end plate 30 that covers an opened front surface (Y-axis direction) and the other surface (direction opposite to the Y-axis) of the module frame 20.

FIG. 2 is a cross-sectional view showing a part of a cross-section taken along the cutting line 2 of FIG. 1.

Referring to FIG. 2, in order to bond the module frame 20 and the end plate 30, welding is performed on the joining surface in a state where the module frame 20 and the end plate 30 are located to face each other.

At this time, a laser welding may be performed for welding, and internal components 40 including battery cells may be damaged due to the laser itself or weld spatters penetrated during the welding process.

Therefore, there is a need for a technology capable of solving the problems of the prior arts.

DETAILED DESCRIPTION OF THE INVENTION

Technical Problem

Embodiments of the present disclosure have been designed to solve the above-mentioned problems involved in the prior art methods and, therefore, it is an object of the present disclosure to provide a battery module that can protect internal components during welding, and a battery pack including the same.

However, the problem to be solved by embodiments of the present disclosure is not limited to the above-described problems, and can be variously expanded within the scope of the technical idea included in the present disclosure.

Technical Solution

A battery module according to an embodiment of the present disclosure includes: a battery cell stack in which a plurality of battery cells are stacked; a module frame that houses the battery cell stack and has an opened front surface and an opened rear surface facing each other; an end plate that covers each of the front surface and the rear surface of the module frame; and an insulator interposed between the battery cell stack and the end plate, wherein the module frame includes a first joining surface formed on sides constituting each of the front surface and the rear surface, wherein the end plate includes a second joining surface joined to the first joining surface, and wherein the insulator includes a rib extending in a direction in which the battery cell stack is located.

The rib may be extended along a direction parallel to one of sides constituting each of the front surface and the rear surface of the module frame.

The rib may be extended from at least one of an upper side, a lower side, and both sides of the insulator.

The rib may be located between the first joining surface and the battery cell stack.

The rib may be integrated with the insulator.

The insulator may include at least one of polycarbonate, polypropylene, and polyethylene terephthalate.

The first joining surface and the second joining surface are weld-connected to each other.

The rib may include a first extension part separated from the first joining surface and extending in a direction in which the battery cell stack is located, and a second extension part extending from one end of the first extension part toward an inner side surface of the module frame.

The first extension part may be parallel to the inner side surface of the module frame, and the second extension part may be perpendicular to the inner side surface of the module frame.

The end plate may include a protruding part located on the center side of the end plate than the second joining surface and protruding in the direction in which the battery cell stack is located.

The rib may include a first extension part separated from the first joining surface and extending in a direction in which the battery cell stack is located, and a second extension part extending from one end of the first extension part toward the inner side surface of the module frame, and the protruding part comes into contact with the first extension part and the second extension part.

The protruding part may include a lower surface in contact with the first extension part, a side surface in contact with the second extension part, and an upper surface in contact with the inner side surface of the module frame.

A chamfer may be formed on the protruding part to improve the assembling property of the end plate and the module frame.

The module frame may be a mono frame in which an upper surface, a lower surface, and both sides are integrated.

The module frame may include a U-shaped frame having an opened front surface, an opened rear surface and an opened upper surface, and an upper cover covering the opened upper surface of the U-shaped frame.

Advantageous Effects

According to the embodiments of the present disclosure, it is possible to prevent the laser or weld spatter penetrated through the rib formed in the insulator from damaging the internal components.

DETAILED DESCRIPTION OF THE EMBODIMENTS

Figure 1:
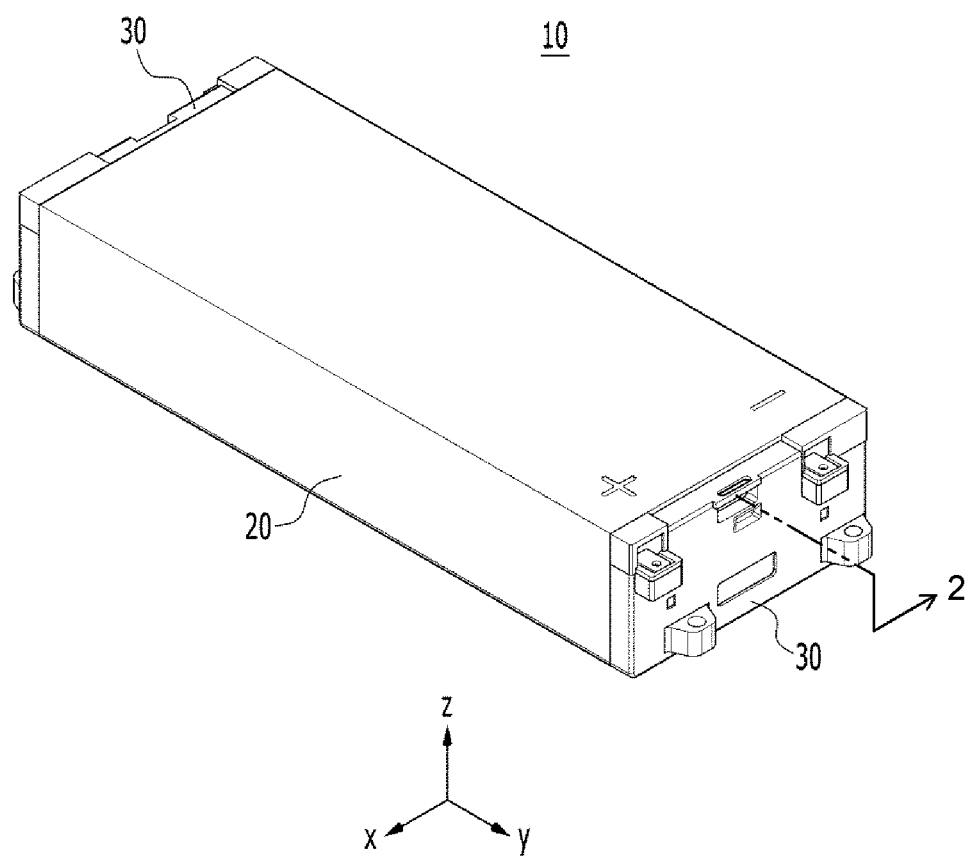
FIG. 1 is a perspective view of a conventional battery module.
Figure 2:
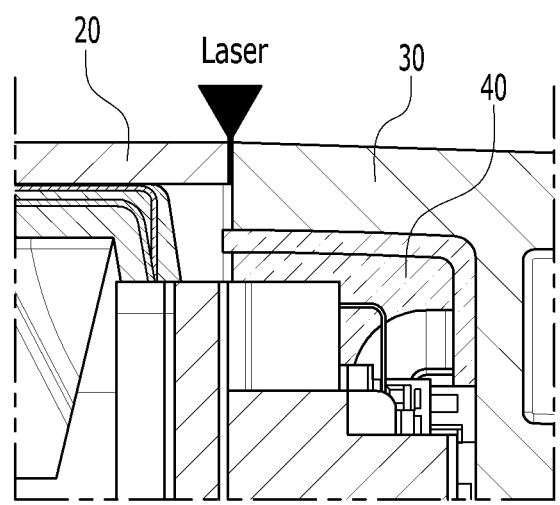
FIG. 2 is a cross-sectional view showing a part of a cross section cut along the cutting line 2 of FIG. 1.

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that it can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Figure 3:
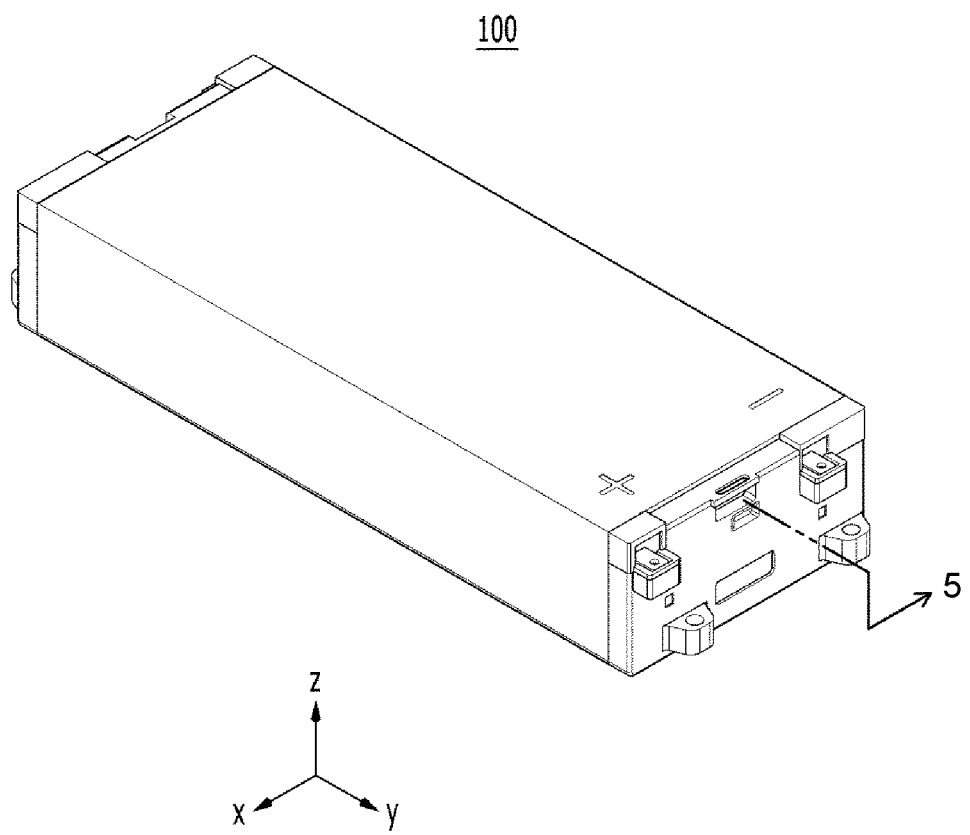
FIG. 3 is a perspective view of the battery module according to one embodiment of the present disclosure.
Figure 4:
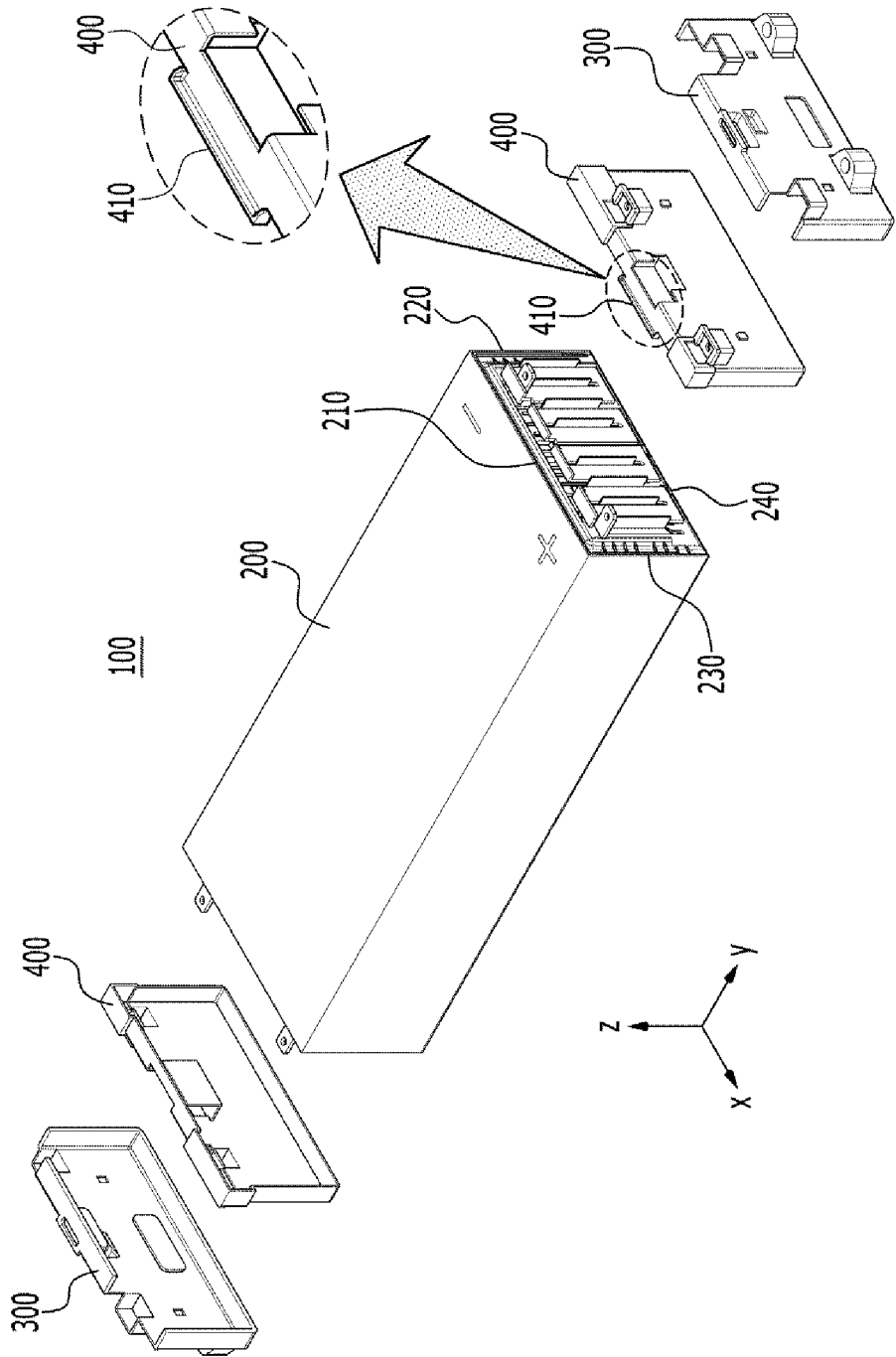
FIG. 4 is an exploded perspective view of the battery module of FIG. 3.

FIG. 3 is a perspective view of the battery module 100 according to one embodiment of the present disclosure, and FIG. 4 is an exploded perspective view of the battery module 100 of FIG. 3.

Referring to FIGS. 3 and 4, the battery module 100 according to one embodiment of the present disclosure includes: a battery cell stack, a module frame 200 that houses the battery cell stack and has an opened front surface (Y-axis direction) and an opened rear surface (direction opposite to the Y-axis) facing each other, an end plate 300 that covers each of the front surface and the rear surface of the module frame 200; and an insulator 400 interposed between the battery cell stack and the end plate 300.

Although not specifically shown in FIG. 4, the battery cell stack is a structure in which a plurality of battery cells are stacked and is housed in the module frame 200.

The module frame 200 is a structure in which the front surface and the rear surface facing each other are opened, and can protect the battery cell stack from the outside.

The end plate 300 can cover the front surface and the rear surface of the module frame 200 to protect electrode leads or bus bars. At this time, in order to prevent the end plate 300 from coming into contact with the electrode lead or the bus bar to cause a danger of short circuit or the like, the end plate 300 may be a metal plate having a predetermined strength, and an insulator 400 is interposed between the battery cell stack and the end plate 300.

Figure 5:
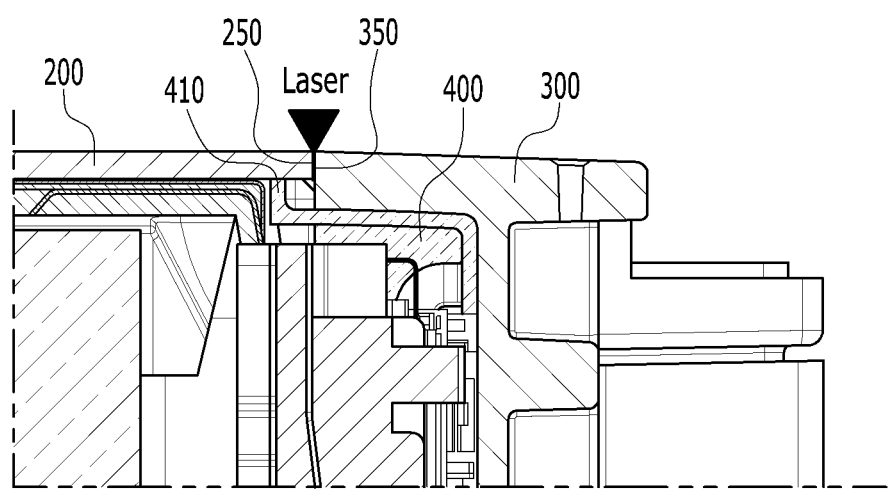
FIG. 5 is a cross-sectional view showing a part of a cross section cut along the cutting line 5 of FIG. 3.

FIG. 5 is a cross-sectional view showing a part of a cross section cut along the cutting line B of FIG. 3.

Referring to FIG. 5 together with FIG. 4, welding is performed in a state in which the first joining surface 250 of the module frame 200 and the second joining surface 350 of the end plate 300 come into contact with each other, so that the end plate 300 is joined to the module frame 200.

The first joining surface 250 is located on the sides 210, 220, 230, and 240 constituting the front surface (Y-axis direction) and the rear surface (direction opposite to the Y-axis) of the module frame 200, respectively. The second joining surface 350 is also provided on the sides of the end plate 300 so as to correspond to the first joining surface 250, and the first joining surface 250 and the second joining surface 350 are joined through welding. That is, the first joining surface 250 and the second joining surface 350 are weld-connected to each other.

The welding method is not limited, but it is preferable to perform laser welding.

However, if a laser beam is shot for welding, the laser beam may transmit through the module frame 200 and the end plate 300 to damage the battery cell stack or other internal components. Further, during the welding process, a weld spatter phenomenon in which welding sparks are scattered in all directions occurs, and the weld spatter can also damage the battery cell stack or other internal components.

Therefore, the insulator 400 in the present embodiment includes a rib 410 extending in a direction in which the battery cell stack is located.

The rib 410 may be extended from at least one of an upper side, a lower side, and both sides of the insulator 400, and may be in a shape extending along a direction parallel to one of the sides 210, 220, 230, and 240 constituting each of the front surface (Y-axis direction) and the rear surface (direction opposite to the Y-axis) of the module frame 200. FIGS. 4 and 5 show, for example, a state in which a rib 410 extending from the upper side of the insulator 400 extends along the direction parallel to the upper side 210 in the front surface (Y-axis direction) of the module frame 200.

Through the structure of the rib 410 as described above, it is possible to block the transmitted laser beam or weld spatter from affecting the battery cell stack or other internal components.

In particular, as shown in FIG. 5, the rib 410 must be located between the first joining surface 250 and the battery cell stack, so the weld spatter can be effectively blocked. That is, the rib 410 may be located between the first joining surface 250 and the second joining surface 350 that are weld-connected to each other, and the battery cell stack.

Figure 6:
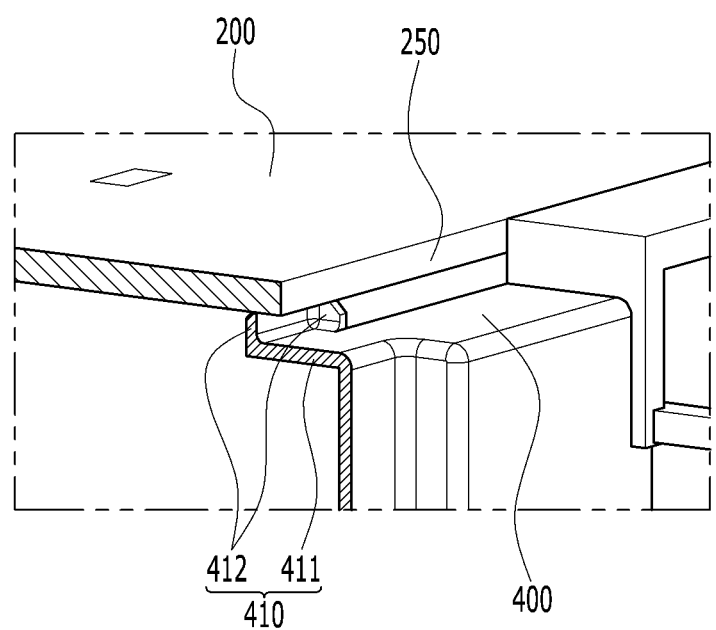
FIG. 6 is a perspective view showing only the module frame and the insulator in the cross section cut along the cutting line 5 of FIG. 3.

FIG. 6 is a perspective view showing only the module frame and the insulator in the cross section cut along the cutting line 5 of FIG. 3.

Referring to FIG. 6, the rib 410 of the insulator 400 may include a first extension part 411 separated from the first joining surface 250 and extending in the direction in which the battery cell stack is located, and a second extension part 412 extending from one end of the first extension part 411 toward the inner side of the module frame 200. In this case, the first extension part 411 may be parallel to the inner side surface of the module frame 200, and the second extension part 412 may be perpendicular to the inner side surface of the module frame 200.

The rib 410 may include a first extension part 411 and a second extension part 412 to form a kind of basket-like appearance. The rib 410 is disposed so as to surround the welded portion of the first joining surface 250 and the second joining surface 350, and thus, can more effectively block the weld spatter in which welding sparks are scattered in all directions.

Further, the configuration of the rib 410 may be a structure that is easy to surround the protruding part of the end plate shown in FIG. 7 described below.

Hereinafter, in FIGS. 7 and 8, as another embodiment of the present disclosure, an end plate 300a having a protruding part 360 and a configuration in which the protruding part 360 is surrounded by the rib 410 will be described.

Figure 7:
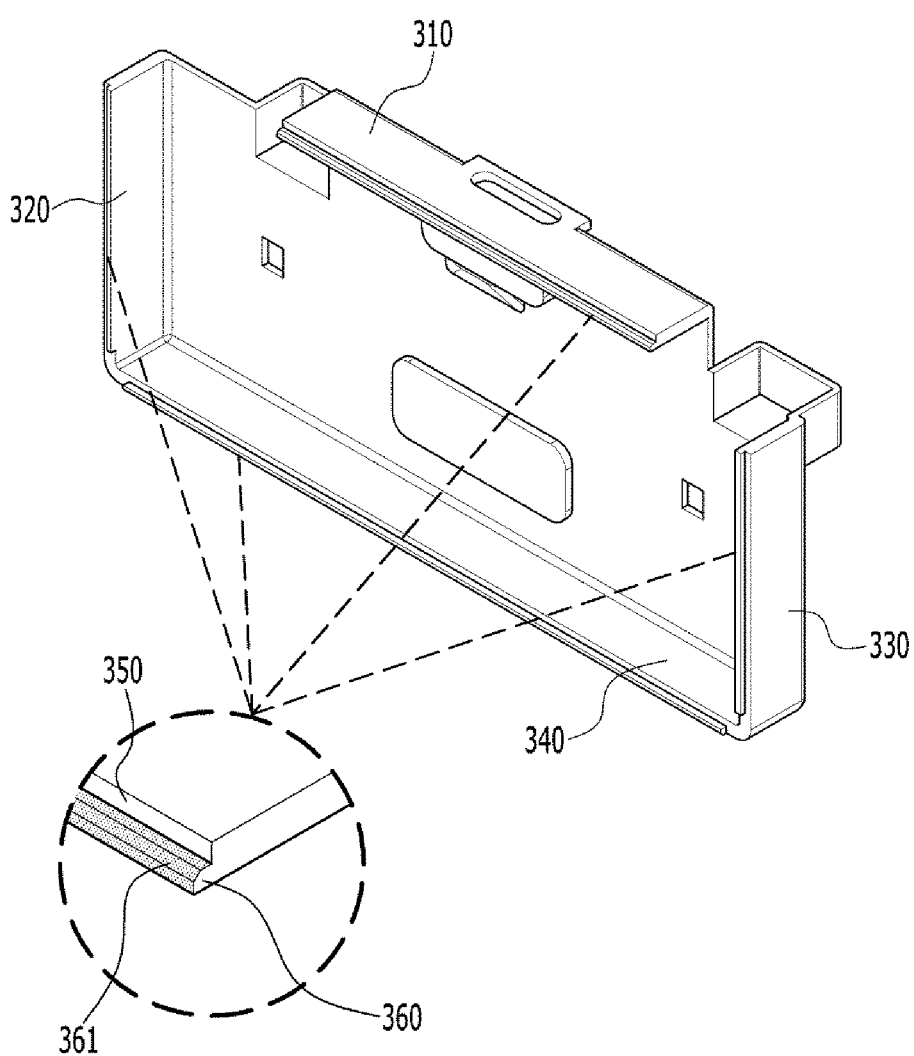
FIG. 7 is a perspective view showing an end plate having a protruding part.

FIG. 7 is a perspective view showing an end plate 300a having a protruding part 360. Referring to FIG. 7, the second joining surface 350 is located on four sides 310, 320, 330, and 340 of the end plate 300a corresponding to the four sides 210, 220, 230 and 240 of the module frame 200 shown in FIG. 3, respectively.

In this case, the end plate 300a may include a protruding part 360 located at the center side of the end plate 300a than the second joining surface 350 and protruding in a direction in which the battery cell stack is located.

The protruding part 360 may be formed on at least one of the four sides 310, 320, 330, and 340 of the end plate 300a, and may be formed on all of the four sides 310, 320, 330 and 340 as shown in FIG. 7.

This protruding part 360 has a shape extending along a direction parallel to one of the four sides 310, 320, 330 and 340 of the end plate 300a, and can block the laser beam and weld sputter transmitted for welding from affecting the battery cell stack and other internal components.

Further, when the end plate 300a is connected to the module frame 200, the protruding part 360 is inserted into the inner side space of the module frame 200, so that the end plate 300a can be connected to a correct position without dislocation. That is, the protruding part 360 may play a role of improving the temporary assembling property between the module frame 200 and the end plate 300a.

Meanwhile, the protruding part 360 may have a structure integrated with the end plate 300a, and the end plate 300a having the protruding part 360 may be manufactured by processing and molding. Since the previously set rib-shaped plates are not joined, a separate joining step is not required.

The protruding part 360 may be disposed in a space where the basket-shaped rib 410 is formed, which will be described in detail in FIG. 8 below.

Figure 8:
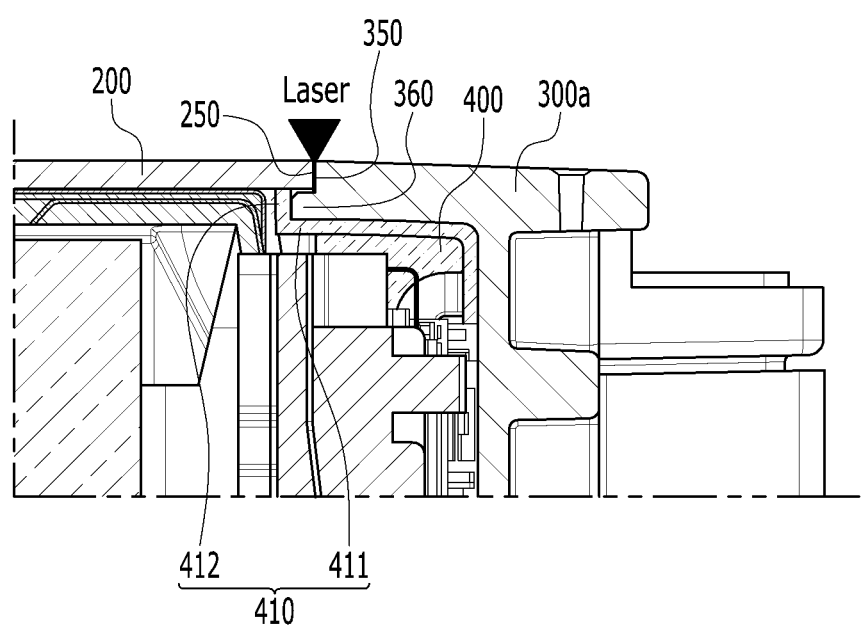
FIG. 8 is a cross-sectional view showing a state in which an end plate having a protruding part is connected to a module frame.

FIG. 8 is a cross-sectional view showing a state in which an end plate 300a having a protruding part 360 is connected to a module frame 200.

Referring to FIG. 8 together with FIGS. 6 and 7, the protruding part 360 of the end plate 300a can be disposed in a space where the rib 410 including the first extension part 411 and the second extension part 412 is formed.

Therefore, the protruding part 360 may include a lower surface in contact with the first extension part 411, a side surface in contact with the second extension part 412, and an upper surface in contact with the inner side surface of the module frame 200.

Since the battery module in the present embodiment includes both the rib 410 and the protruding part 360, it is possible to more effectively block the laser and weld spatter that can be transmitted during the welding process of the first joining surface 250 and the second joining surface 350.

Specifically, the protruding part 360 may primarily block the laser that is transmitted from the first joining surface 250 and the second joining surface 350, and the rib 410 of the insulator 400 may secondarily block the weld spatter that may be scattered into the gap between the protruding part 360 and the inner side surface of the module frame 200.

Meanwhile, in FIG. 7, a chamfer 361 may be formed on the protruding part 360 to improve the assembling property of the end plate 300a and the module frame 200. In particular, the chamfer 361 may be formed at a corner of the protruding part 360 that comes into contact with the inner side surface of the module frame 200.

The protruding part 360 may be located adjacent to the first joining surface 250 and the second joining surface 350, and thus, it may be difficult to insert the protruding part 360 into the inner side space of the module frame 200. Through the chamfer 361, it is possible to prevent this problem and improve the assembling property of the end plate 300 and the module frame 200.

Meanwhile, the rib 410 may have a structure integrated with the insulator 400 and may be manufactured by plastic injection molding. Accordingly, the thickness or shape of the rib 410 can be freely modified according to the applied battery module.

Further, the insulator 400 is for preventing the end plate 300 from coming into contact with the electrode lead or the bus bar and causing a danger of short circuit or the like, and it is preferable to include a material exhibiting electrical insulation.

The material exhibiting such electrical insulation may include at least one of polycarbonate (PC), polypropylene (PP), and polyethylene terephthalate (PET)

Figure 9:
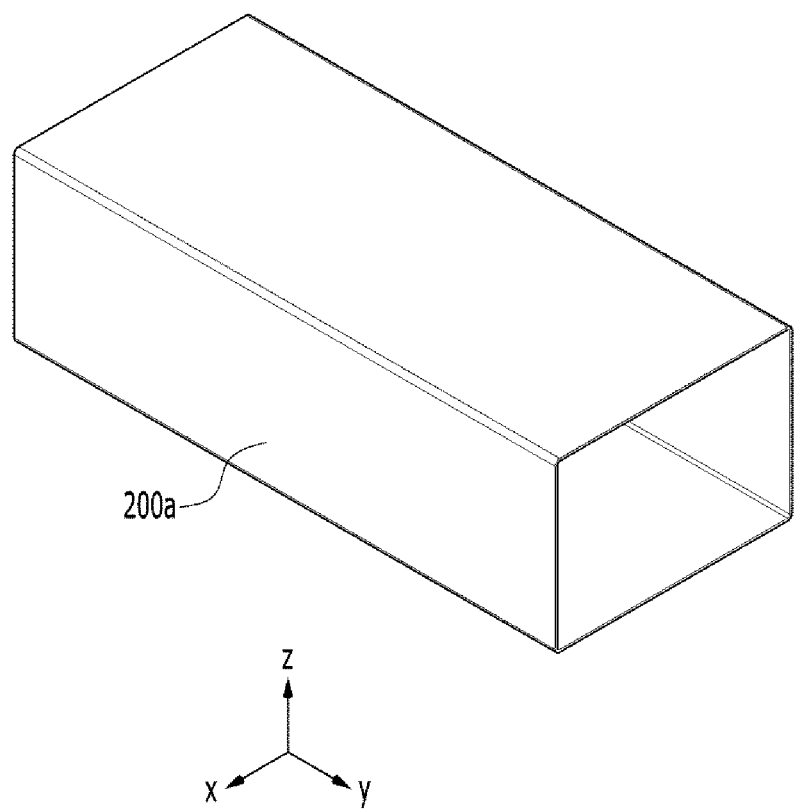
FIG. 9 is a perspective view showing a mono frame.
Figure 10:
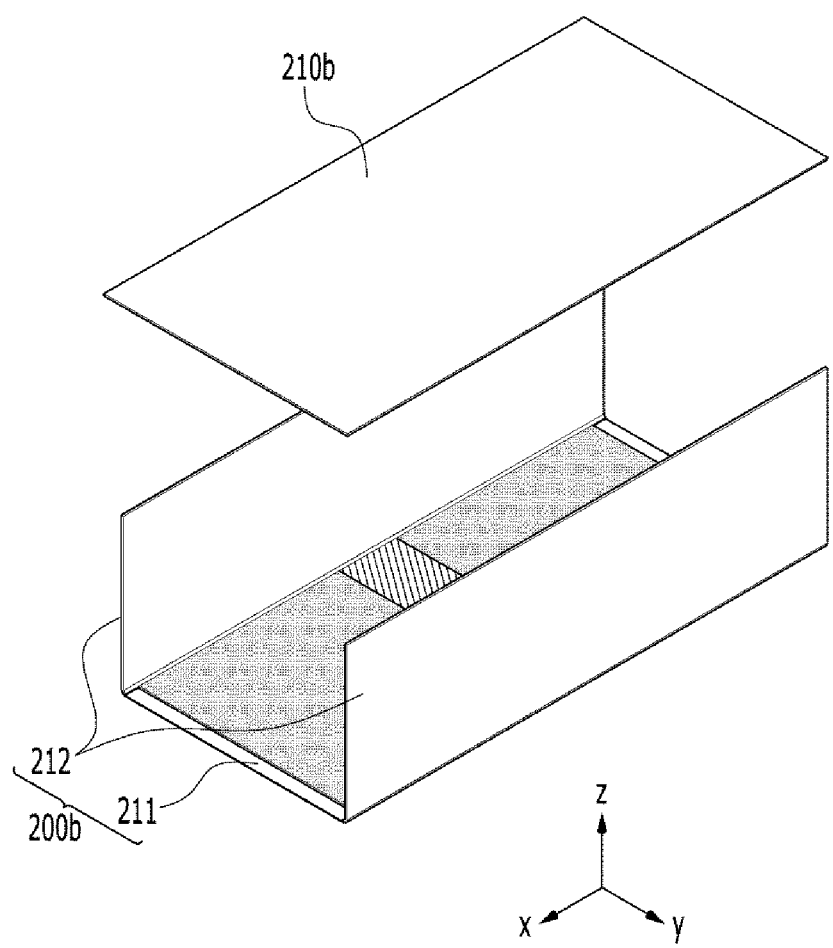
FIG. 10 is a perspective view showing a U-shaped frame and an upper cover.

Meanwhile, the module frame 200 in the present disclosure may be a mono frame or a U-shaped frame. FIGS. 9 and 10 are for illustrating this. FIG. 9 is a perspective view showing a mono frame 200a, and FIG. 10 is a perspective view showing a U-shaped frame 200b and an upper cover 210b. Other configurations are omitted for convenience of description.

First, referring to FIG. 9, the module frame used in the present disclosure may be a mono frame 200a.

The mono frame 200a may have a structure of metal plate in which the front surface (Y-axis direction) and the rear surface (direction opposite to the Y-axis) are opened, and the upper surface (Z-axis direction), the lower surface (direction opposite to the Z-axis) and both side surfaces (X-axis direction and the opposite direction thereof) are integrated. The opened front surface and the opened rear surface of the mono frame are connected by the above-mentioned end plates.

Next, referring to FIG. 10, the module frame in the present disclosure may include a U-shaped frame 200b and an upper cover 210b.

The U-shaped frame 200b may have a structure in which a front surface (X-axis direction), a rear surface (direction opposite to the X-axis), and an upper surface (Z-axis direction) are opened, and it is provided with both side surface ports 212 extending in the upper direction (Z-axis direction) from the bottom part 211 and both opposite ends of the bottom part 211.

The upper cover 210b is connected to the opened upper surface of the U-shaped frame 200b, and the opened front surface and the opened rear surface of the U-shaped frame 200b may be connected by the above-mentioned end plates, respectively.

The U-shaped frame 200b may be connected to the upper cover 210b by welding. Meanwhile, it is preferable that the module frame 200 and the end plate 300 of the present embodiment be a metal plate having a predetermined strength, and in particular, it is preferable to include an aluminum alloy. More specifically, the module frame 200 may include an Al—Mg-based alloy such as Al 5052 or an Al—Mg—Si-based alloy such as Al 6063, and the end plate 300 may include an Al—Si—Cu-based alloy such as ADC12 alloy, or an alloy in which Mg and Mn are added to an Al—Si based alloy such as Silafont-36 alloy.

One or more battery modules according to the present embodiment described above may be mounted together with various control and protection systems such as a battery management system (BMS) and a cooling system to form a battery pack.

The battery module or the battery pack including the battery module may be applied to various devices. These devices may be applied to transportation means such as an electric bicycle, an electric vehicle, a hybrid vehicle, but the present disclosure is not limited thereto and can be applied to various devices that can use the secondary battery.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
200: module frame
250: first joining surface
300: end plate
350: second joining surface
400: insulator
410: rib

The invention claimed is:

1. A battery module comprising:
a module frame configured to house a battery cell stack and has an opened front side and an opened rear side spaced from each other in a first direction;
an end plate that covers each of the front side and the rear side of the module frame; and
an insulator interposed between the module frame and the end plate,
wherein the module frame includes a first joining surface formed at each of the front side and the rear side,
wherein the end plate includes a second joining surface joined to the first joining surface, and
wherein the insulator includes a rib having a first extension part extending in the first direction and under the first joining surface and the second joining surface.

2. The battery module as set forth in claim 1, wherein the rib extends along a direction parallel to one of sides constituting each of the front side and the rear side of the module frame.

3. The battery module as set forth in claim 1, wherein the rib extends from at least one of an upper side and a lower side of the insulator.

4. The battery module as set forth in claim 1, wherein the rib is located under the first joining surface.

5. The battery module as set forth in claim 1, wherein the rib is integrally formed with the insulator.

6. The battery module as set forth in claim 1, wherein the insulator includes at least one selected from the group consisting of polycarbonate, polypropylene, and polyethylene terephthalate.

7. The battery module as set forth in claim 1, wherein the first joining surface and the second joining surface are welded to each other.

8. The battery module as set forth in claim 1, wherein the rib further includes a second extension part extending from one end of the first extension part toward an inner side surface of the module frame.

9. The battery module as set forth in claim 8, wherein the first extension part is parallel to the inner side surface of the module frame, and the second extension part is perpendicular to the inner side surface of the module frame.

10. The battery module as set forth in claim 1, wherein the end plate includes a protruding part located on a center of the end plate and protruding in the first direction.

11. The battery module as set forth in claim 10, wherein the rib further includes a second extension part extending from one end of the first extension part toward the inner side surface of the module frame, and
    wherein the protruding part contacts the first extension part and the second extension part.

12. The battery module as set forth in claim 11, wherein the protruding part includes a lower surface in contact with the first extension part, a side surface in contact with the second extension part, and an upper surface in contact with the inner side surface of the module frame.

13. The battery module as set forth in claim 1, wherein the module frame is a mono frame in which an upper surface, a lower surface, and opposite sides are integrally formed.

14. The battery module as set forth in claim 1, wherein the module frame includes a U-shaped frame, and an upper cover covering the U-shaped frame.

15. A battery pack comprising one or more battery modules as set forth in claim 1.

16. A battery module comprising:
    a module frame configured to house a battery cell stack and has an opened front side and an opened rear side spaced from each other in a first direction;
    an end plate that covers each of the front side and the rear side of the module frame; and
    an insulator interposed between the module frame and the end plate,
    wherein the module frame includes a first joining surface formed at each of the front side and the rear side,
    wherein the end plate includes a second joining surface joined to the first joining surface,
    wherein the insulator includes a rib extending in the first direction,
    wherein the end plate includes a protruding part located on a center of the end plate and protruding in the first direction, and
    wherein a chamfer is formed on the protruding part.

* * * * *